United States Patent
Schwab et al.

(10) Patent No.: US 10,428,929 B2
(45) Date of Patent: Oct. 1, 2019

(54) COMPOSITE PLANETARY STAKING PIN WITH LUBRICATION FEED FEATURE

(71) Applicant: Schaeffler Technologies AG & Co. KG, Herzogenaurach (DE)

(72) Inventors: Charles Schwab, Fort Mill, SC (US); Dennis Roffe, Fort Mill, SC (US); Alfred Thomas, Mint Hill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/888,308

(22) Filed: Feb. 5, 2018

(65) Prior Publication Data

US 2019/0242472 A1    Aug. 8, 2019

(51) Int. Cl.
| | |
|---|---|
| F16H 57/08 | (2006.01) |
| F16H 57/04 | (2010.01) |
| F16C 19/44 | (2006.01) |
| F16C 33/66 | (2006.01) |
| F16H 1/28 | (2006.01) |

(52) U.S. Cl.
CPC ......... F16H 57/0479 (2013.01); F16C 19/44 (2013.01); F16C 33/6659 (2013.01); F16H 57/043 (2013.01); F16H 57/0482 (2013.01); F16H 57/082 (2013.01); F16H 1/28 (2013.01); F16H 2057/085 (2013.01)

(58) Field of Classification Search
CPC ... F16H 57/0482; F16H 57/0479–0495; F16H 57/043; F16H 57/082; F16H 2057/085; F16C 19/44
See application file for complete search history.

(56) References Cited

U.S. PATENT DOCUMENTS

| | | | | |
|---|---|---|---|---|
| 5,102,379 | A | * | 4/1992 | Pagluica ............... F16H 1/2836 475/159 |
| 2006/0112531 | A1 | * | 6/2006 | Skrabs ............... F16H 57/0482 57/482 |
| 2007/0202986 | A1 | * | 8/2007 | Kotani ................. F16C 33/543 475/331 |
| 2011/0092330 | A1 | * | 4/2011 | Nishida .................. F16C 17/02 475/159 |
| 2011/0172048 | A1 | * | 7/2011 | Nishida ................ F16C 17/102 475/159 |
| 2014/0329636 | A1 | * | 11/2014 | Heuver ................ F16H 57/082 475/331 |
| 2016/0258528 | A1 | * | 9/2016 | Carlino ................ F16H 57/082 |
| 2017/0108113 | A1 | * | 4/2017 | Hasting ............... F16H 57/0471 |

* cited by examiner

*Primary Examiner* — Jacob S. Scott
*Assistant Examiner* — Lilliam T Nguyen
(74) *Attorney, Agent, or Firm* — Volpe and Koenig, P.C.

(57) ABSTRACT

A planetary transmission assembly including a composite planetary staking pin is disclosed. The composite planetary staking pin fixes a planetary gear to a planetary carrier, and the planetary gear is supported on the composite planetary staking pin by rolling elements. The composite planetary staking pin includes an inner pin body having axial ends with circular grooves. The composite planetary staking pin is fixed to the planetary carrier via staking of the axial ends of the inner pin body. An outer sleeve of the composite planetary staking pin is fixed to the inner pin body. The outer sleeve defines a circumferentially extending helical channel that provides a lubricant flow path between an inlet defined by the planetary carrier and an outlet to the rolling elements.

19 Claims, 13 Drawing Sheets

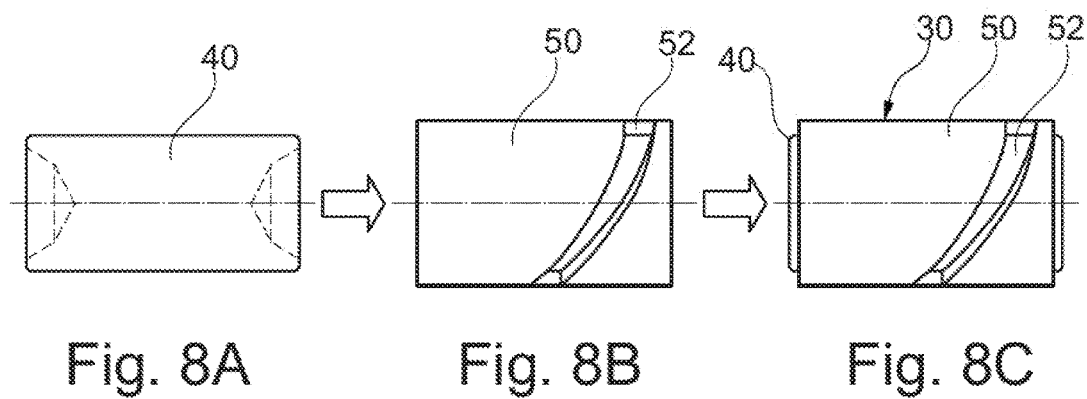

COMPOSITE PLANETARY STAKING PIN WITH LUBRICATION FEED FEATURE

FIELD OF INVENTION

This application is generally related to a planetary transmission, and is more particularly related to a staking pin for a planetary transmission.

BACKGROUND

Modern planetary automatic transmissions have relatively complex arrangements including multiple planetary gearsets in order to achieve varying speed ratios while still providing a compact overall arrangement. The need to provide improved ratios and outputs for planetary automatic transmissions has increased the relative speeds of the transmission components significantly. These increase demands have increased the need to provide a relatively high volume of lubrication to the transmission elements, such as the rolling elements between an associated planetary gear and pinion shaft.

Known solutions for providing lubricant to these planetary arrangements have included designing a more complicated and expensive planetary staking pin. These known planetary staking pins require specialized formation techniques to provide a localized hardened portion to support the rolling elements. However, the axial ends of the pins must be relatively softer to facilitate axial fixation of the pin to a corresponding planetary carrier through staking or riveting. These known pins typically include internal lubrication passages that are drilled into the pin's body to direct lubricant from the planetary carrier to a load zone of the rolling elements.

FIGS. 1A and 1B illustrate known arrangements for a planetary transmission 100a, 100b. As shown in these planetary transmissions 100a, 100b, a planetary staking pin 110a, 110b includes an internal lubrication passage 120a, 120b for directing lubrication from a planetary carrier 130a, 130b to rolling elements 140a, 140b supporting a planetary gear 150a, 150b. FIG. 1C illustrates a flowpath of lubrication for the type of arrangements of FIGS. 1A and 1B.

FIG. 2A-2D illustrate a known type of planetary staking pin 110c. The planetary staking pin 110c includes a lubricant inlet 112 proximate to an axial end of the pin 110c, a lubricant outlet 114 in a medial portion of the pin 110c, and a localized hardened zone 116 in a medial region of the pin 110c for forming a raceway for associated rolling elements. Creating the geometry for this type of planetary staking pin 110c is relatively complicated and expensive.

These known types of planetary staking pins 110a, 110b, 110c require a complicated and expensive planetary pin blank that requires special geometrical features to accommodate the necessary heat treatment process. There are competing needs of the planetary pin to have both (a) relatively softer ends to allow for staking the associated planetary carrier, and (b) a relatively harder medial portion to provide a raceway for rolling elements.

Accordingly, there is a need for a planetary staking pin that is relatively easy to assemble and inexpensive, that also provides the requisite structural characteristics to allow staking at its axial ends and provide a suitable rolling element raceway.

SUMMARY

Briefly stated, a composite planetary staking pin is provided for a planetary transmission assembly. The composite planetary staking pin provides an adaptable configuration that accommodates a variety of design constraints based on the ability to select an inner pin body of the composite planetary staking pin according to one set of design considerations and select an outer sleeve of the composite planetary staking pin according to a different set of design considerations.

The planetary transmission assembly includes a sun gear having sun gear teeth, a ring gear having ring gear teeth arranged concentric about the sun gear, and a planetary gear arranged between the sun gear and the ring gear. The planetary gear includes planetary gear teeth that mesh with the sun gear teeth and the ring gear teeth. The planetary gear is fixed to a planetary carrier by the composite planetary staking pin. The planetary gear is supported on the composite planetary staking pin by rolling elements arranged between the composite planetary staking pin and the planetary gear. The composite planetary staking pin includes an inner pin body having axial ends with circular grooves. The composite planetary staking pin is fixed to the planetary carrier via staking of the axial ends of the inner pin body. An outer sleeve of the composite planetary staking pin is fixed to the inner pin body. The outer sleeve defines a circumferentially extending helical channel. A lubricant flow path is defined by the channel between an inlet defined by the planetary carrier and an outlet to the rolling elements.

Preferred arrangements with one or more features of the embodiments are described below and in the claims.

BRIEF DESCRIPTION OF THE DRAWINGS

The foregoing summary as well as the following detailed description will be best understood when read in conjunction with the appended drawing. In the drawings:

FIGS. 8A-8C illustrate steps for assembling the inner pin body with the outer sleeve of the composite planetary staking pin.

DETAILED DESCRIPTION OF THE PREFERRED EMBODIMENTS

Figure 1A:
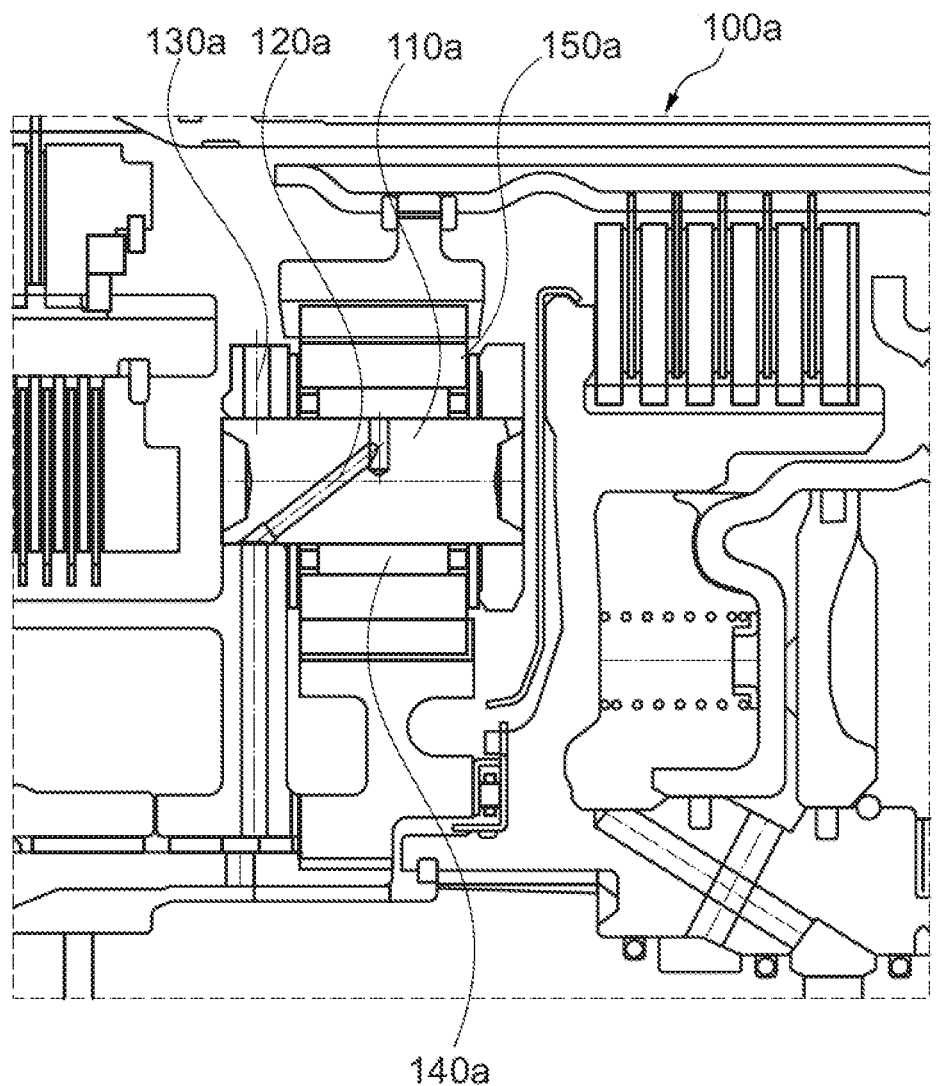
FIGS. 1A and 1B illustrate a planetary transmission according to the prior art.
Figure 1B:
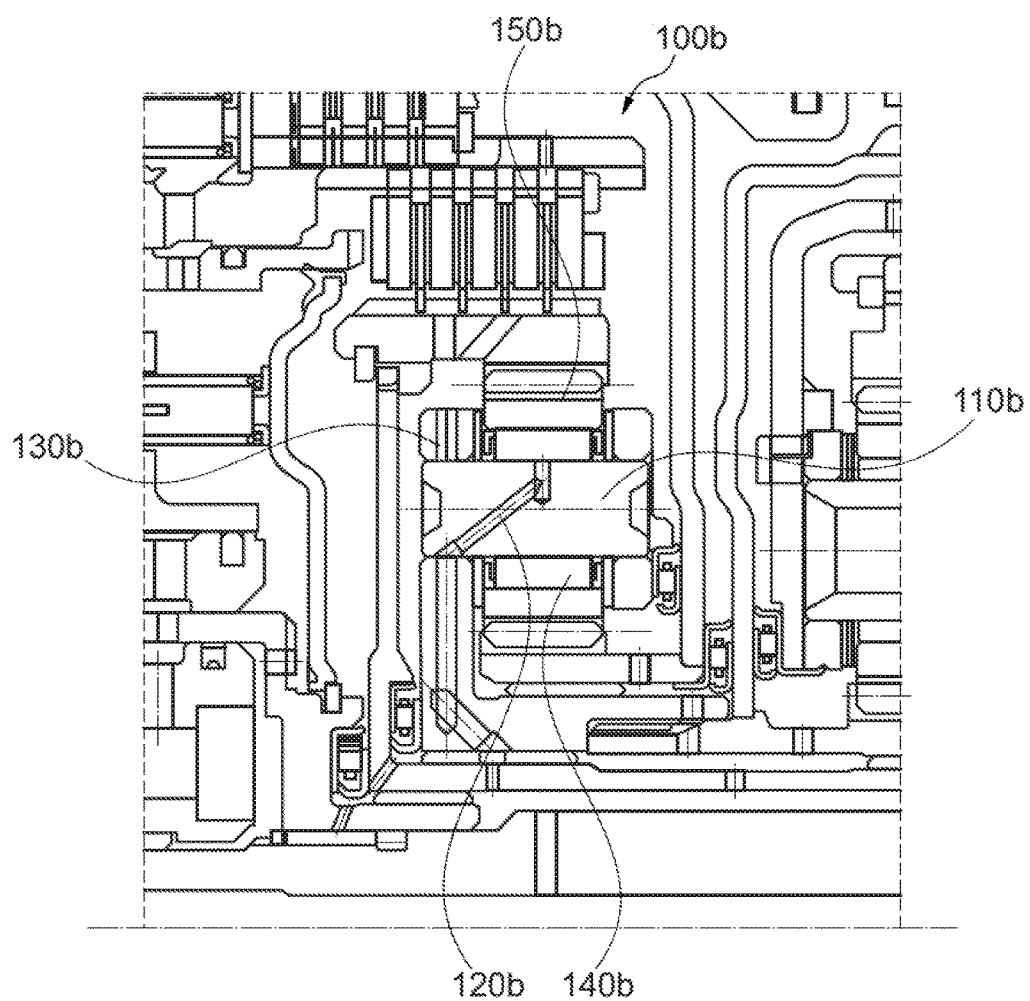

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 3:
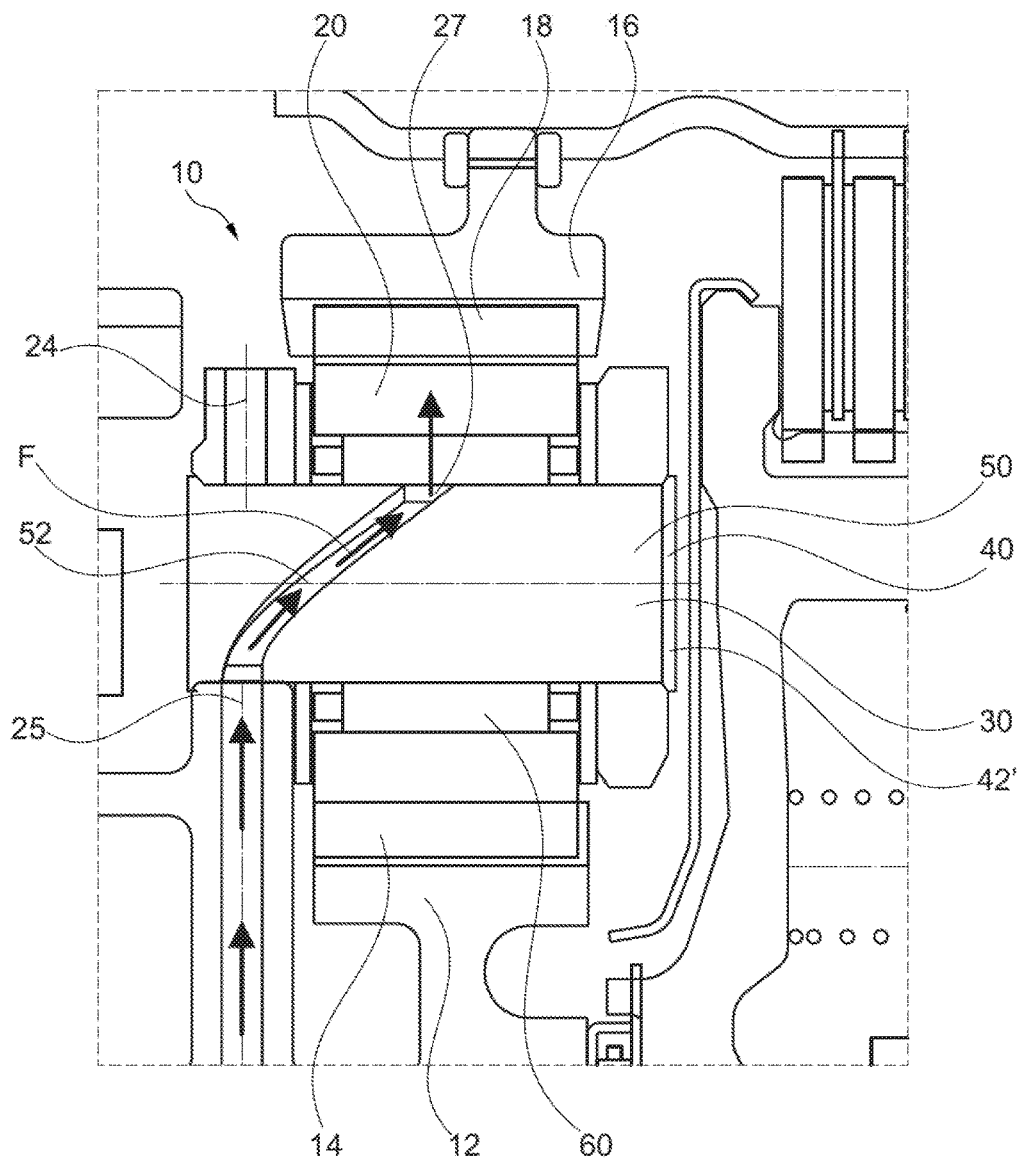
FIG. 3 illustrates a schematic view of a planetary transmission assembly according to one embodiment.

A planetary transmission assembly 10 is shown in FIG. 3. The planetary transmission assembly 10 includes a sun gear 12 including sun gear teeth 14, a ring gear 16 including ring gear teeth 18 and arranged concentric about the sun gear 12, a planetary gear 20 arranged between the sun gear 12 and the ring gear 16, and a planetary carrier 24 configured to carry the planetary gear 20. The planetary gear 20 includes planetary gear teeth 22 that mesh with the sun gear teeth 14 and the ring gear teeth 18. Although only one planetary gear is described herein, one of ordinary skill in the art would understand that a plurality of planetary gears are used in planetary transmission assemblies. The sun gear 12, the ring gear 16, and the planetary gear 20 are well known to those of ordinary skill in the art, and these features and the modes of operation are not described in further detail.

The planetary gear 20 is fixed to the planetary carrier 24 by a composite planetary staking pin 30. The planetary gear 20 is supported on the composite planetary staking pin 30 by rolling elements 60 arranged between the composite planetary staking pin 30 and the planetary gear 20. In one embodiment, the rolling elements 60 are needle rollers.

The composite planetary staking pin 30 includes an inner pin body 40 and an outer sleeve 50. Accordingly, the composite planetary staking pin 30 has a bifurcated design. By using a composite planetary staking pin 30, the specific requirements for the inner pin body 40 and for the outer sleeve 50 can be specifically selected depending on the precise requirements for a particular planetary transmission assembly. In one embodiment, the inner pin body 40 is formed from a first, relatively softer material, and the outer sleeve 50 is formed from a second material that is relatively harder than the first material of the inner pin body 40.

Figure 2A:
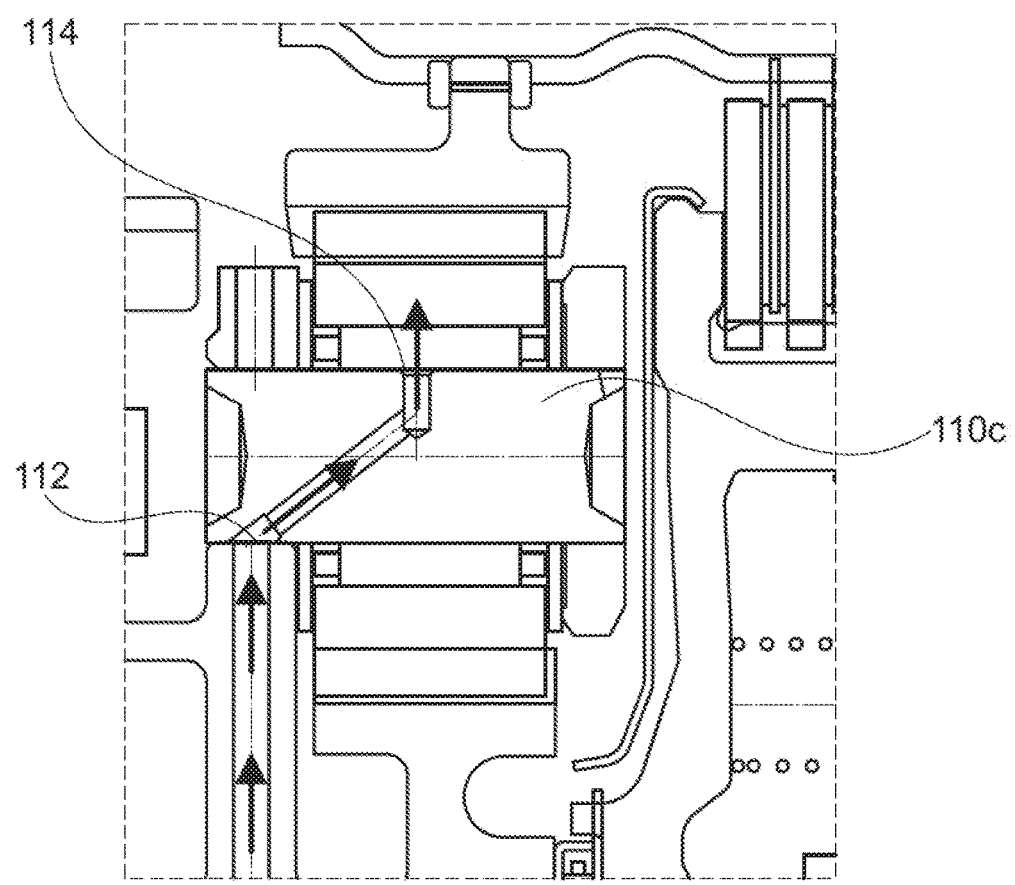
FIGS. 2A-2D illustrate a planetary staking pin according to the prior art.
Figure 2B:
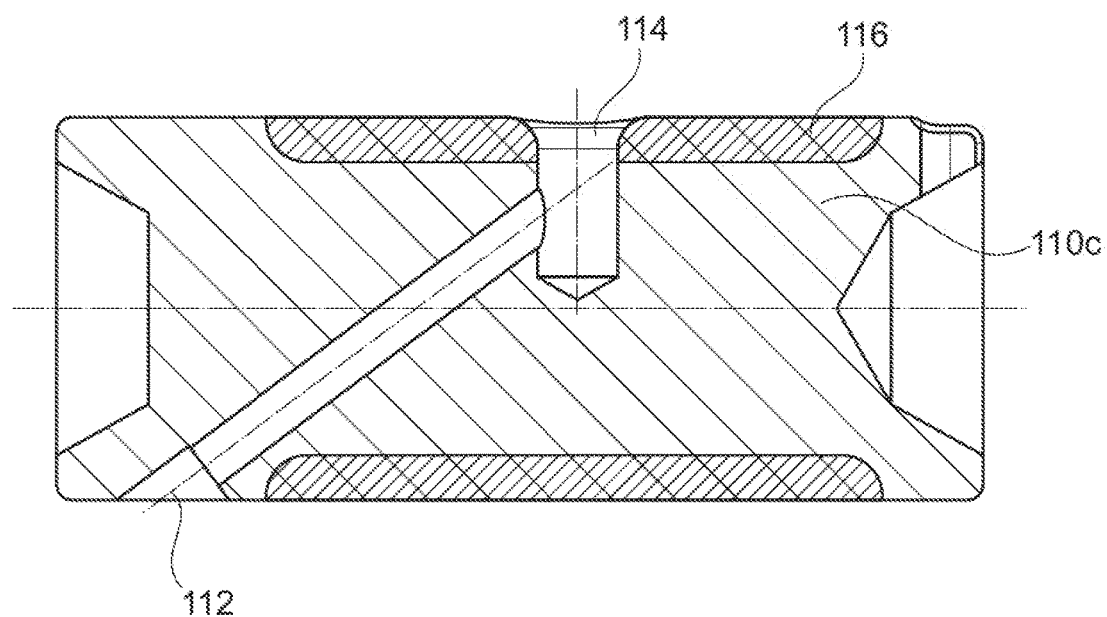
Figure 2C:
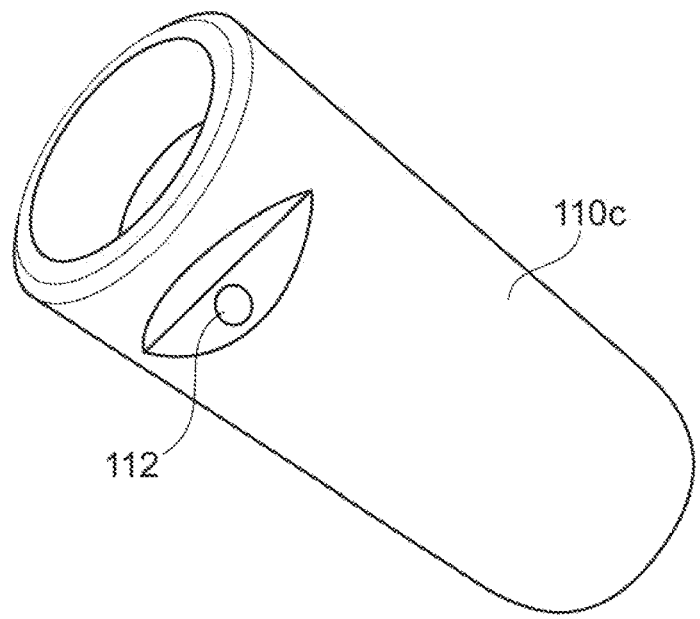
Figure 2D:
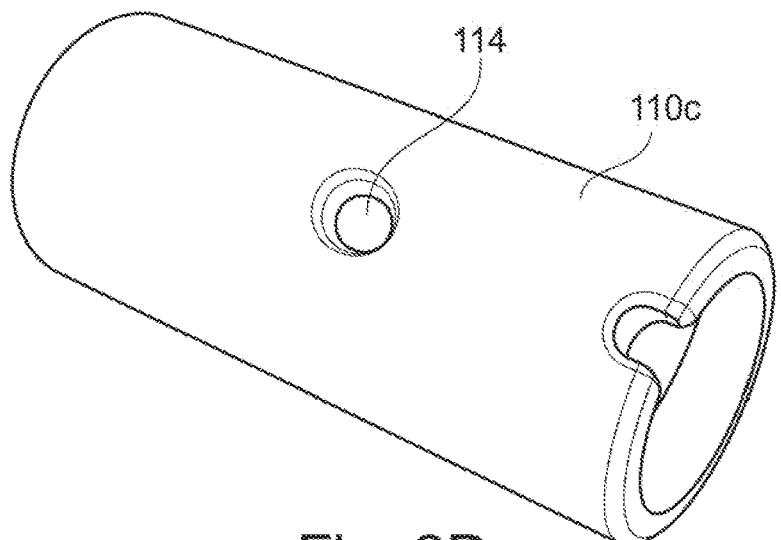
Figure 5A:
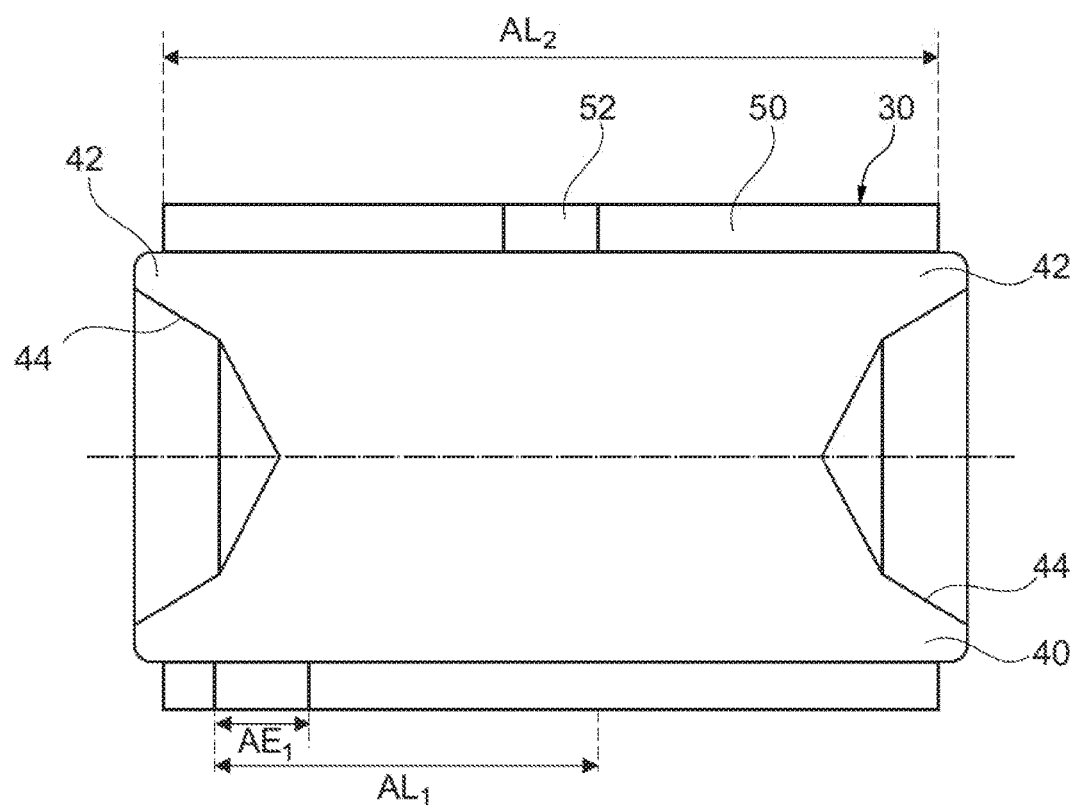
FIG. 5A illustrates a cross-section view of a composite planetary staking pin for the planetary transmission assembly of FIGS. 3 and 4.

The inner pin body 40 includes axial ends 42 with circular grooves 44. The composite planetary staking pin 30 is fixed to the planetary carrier 24 by staking the axial ends 42 of the inner pin body 40. A pre-staking configuration for the axial ends 42 of the inner pin body 40 is shown, for example, in FIGS. 5A-5C. A post-staking configuration for the axial ends 42' of the inner pin body 40 is shown, for example, in FIG. 3. As shown in FIG. 5A, the inner pin body 40 is solid (i.e. uninterrupted and lacks any internal bores or channels) between the circular grooves 44 at the axial ends 42. This provides a less complicated inner pin body 40 compared to known arrangements that require internal bores for lubrication channels, such as shown in FIGS. 2B-2D.

Figure 5B:
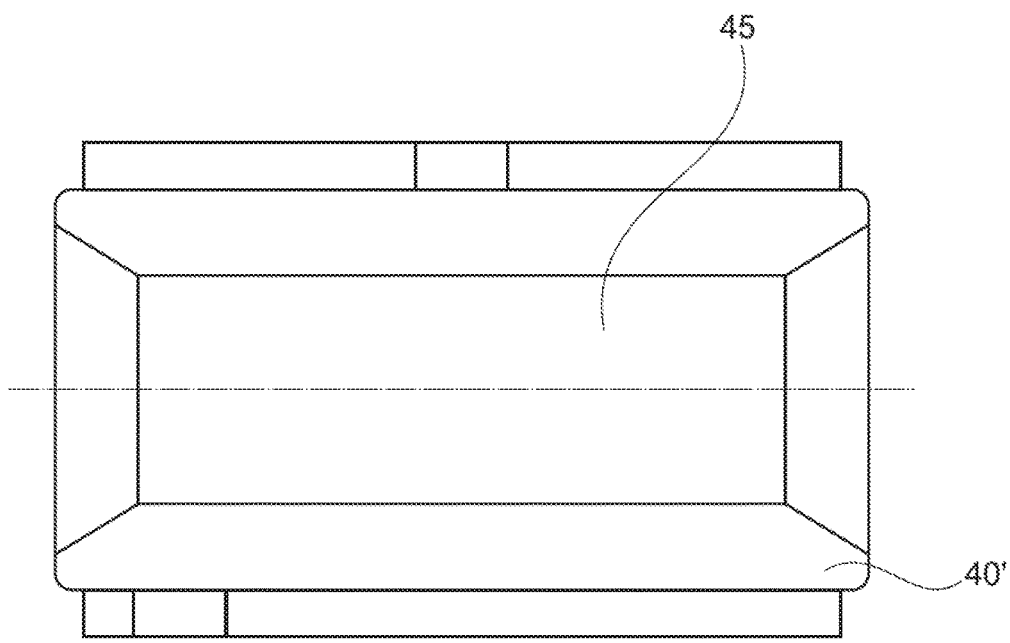
FIG. 5B illustrates an alternative embodiment for an inner pin body of the composite planetary staking pin of FIG. 5A.
Figure 5C:
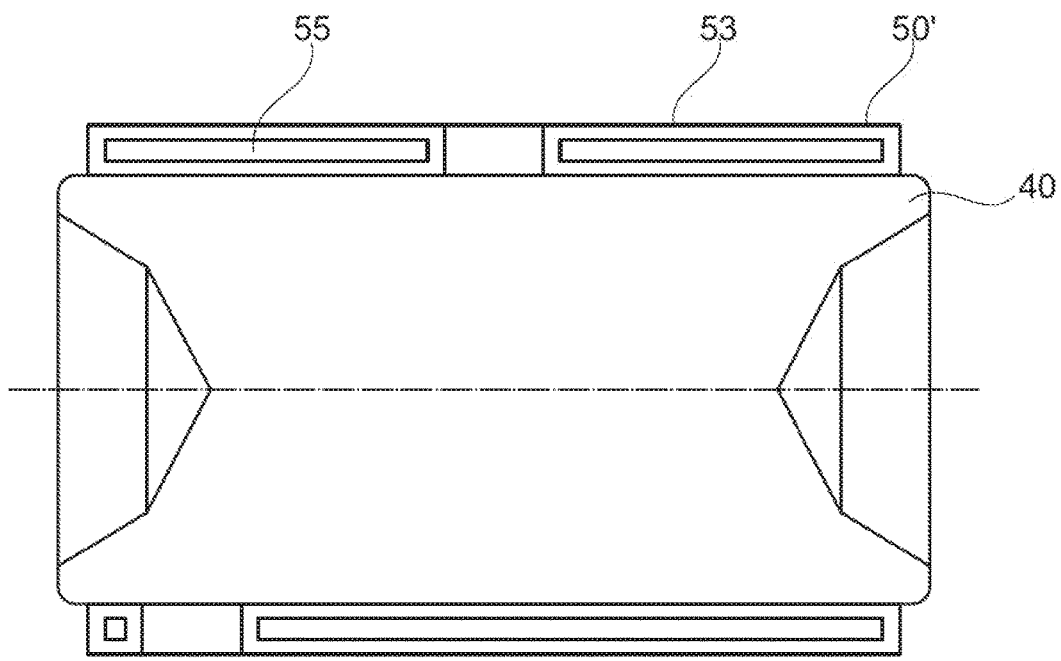
FIG. 5C illustrates an alternative embodiment for an outer sleeve of the composite planetary staking pin of FIG. 5A.
Figure 6A:
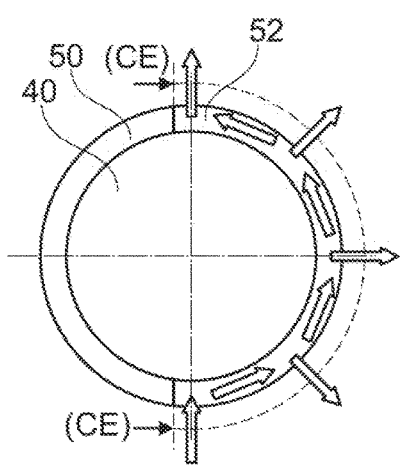
FIG. 6A illustrates an axial view of the composite planetary staking pin.
Figure 6B:
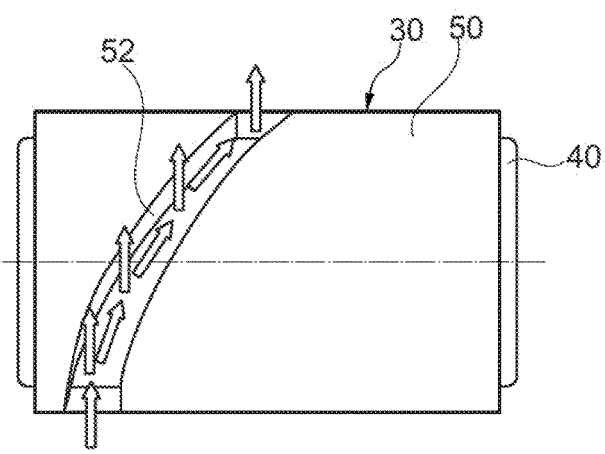
FIG. 6B illustrates a side view of the composite planetary staking pin.

In one embodiment, shown in FIG. 5B, the inner pin body 40' is hollow and includes a central opening 45 extending axially between the axial ends of the inner pin body 40'. This embodiment provides a lightweight configuration that reduces the mass of a typical solid pin body. In one embodiment, the circular grooves 44 of the inner pin body 40 are formed by drilling. In another embodiment, the inner pin body 40 is a cold-formed and deep-drawn component. In one embodiment, the inner pin body 40 is formed with by turning processes, or cold-forged depending on a desired geometry. Relatively lower steel grades can be used to form the inner pin body 40, which reduces the relative costs for forming the inner pin body 40. The inner pin body 40 can be formed according to a variety of formation processes, with varying features and geometries due to the ability to allocate the load bearing function (from rolling elements 60) of the staking pin 30 completely to the outer sleeve 50 instead of the inner pin body 40.

The outer sleeve 50 defines a circumferentially extending helical channel 52. Once installed, the channel 52 defines a lubricant flow path with an inlet 25 defined by the planetary carrier 24 and an outlet 27 to the rolling elements 60. This flow path F is most clearly illustrated by arrows along the channel 52 in FIGS. 3, 4, 6A, and 6B. In one embodiment, shown in FIG. 5C, the outer sleeve 50' is case-hardened, and includes a carburized outer layer 53 and a relatively softer inner core 55. In one embodiment, the outer sleeve 50 is formed by cold-forming and deep-drawing, with the channel 52 being formed by piercing. In one embodiment, the piercing step for the channel 52 is incorporated into a deep-drawing tooling die set. An outer surface of the outer sleeve 50 can be finish ground and/or honed to achieve geometrical tolerances and a desired surface texture. One of ordinary skill in the art would understand that the outer sleeve 50 can be formed according to a variety of formation processes.

An axial extent ($AE_1$) of the channel 52 of the outer sleeve 50 is relatively small compared a total axial length ($AL_2$) of the outer sleeve 50. In one embodiment, the axial extent ($AE_1$) of the channel 52 is less than 20% of the total axial length ($AL_2$) of the outer sleeve 50. In another embodiment, the axial extent ($AE_1$) of the channel 52 is less than 10% of the total axial length ($AL_2$) of the outer sleeve 50.

In one embodiment, the channel 52 has an axial length ($AL_1$) that is at least 25% of a total axial length ($AL_2$) of the outer sleeve 50. In another embodiment, the channel 52 can extend a majority of the total axial length of the outer sleeve 50. In one embodiment, the channel 52 has a circumferential extent (CE) of 170-190 degrees. In another embodiment, the channel 52 has a circumferential extent (CE) of at least 180 degrees. As specifically shown in FIG. 6A, the circumferential extent (CE) of the channel 52 is slightly greater than 180 degrees. This arrangement ensures that the channel 52 does not circumferentially extend substantially into the primary load zone, which is illustrated in FIG. 4.

Figure 4:
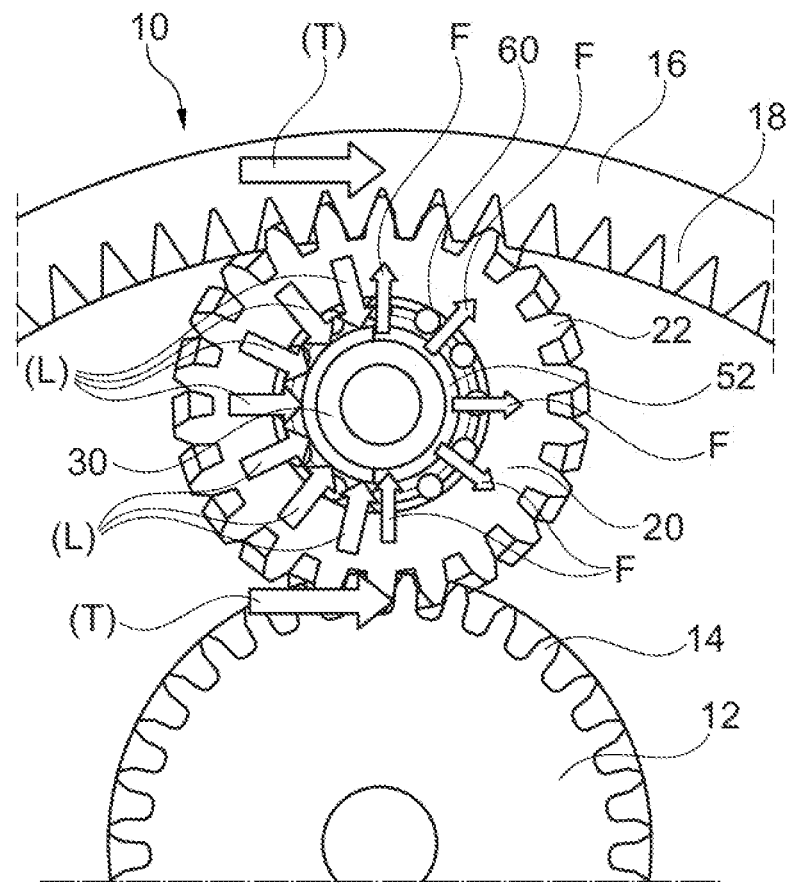
FIG. 4 illustrates an alternative view of the planetary transmission assembly of FIG. 3.
Figure 7:
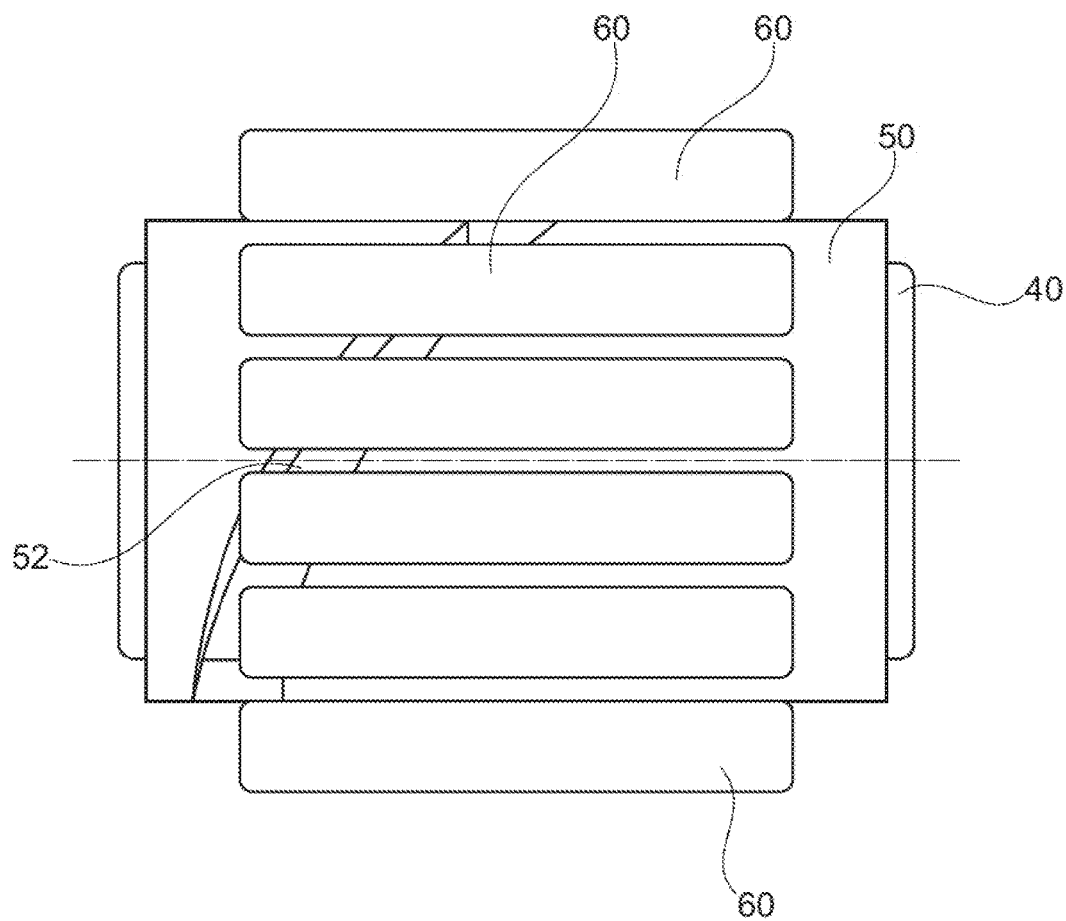
FIG. 7 illustrates rolling elements surrounding a periphery of the composite planetary staking pin.

FIG. 4 represents a primary drive mode for the planetary transmissions assembly 10. During normal operation of the planetary transmission assembly 10, a primary load zone is generated on a trailing side of the planetary gear 20 as the planetary gear 20 travels clockwise around the sun gear 12. Arrows indicating torque transmission (T) are illustrated on the sun gear 12 and on the ring gear 16 in FIG. 4. The primary load zone is illustrated by a plurality of load arrows (L) directed radially inward in FIG. 4. This primary load zone is limited to the left side (i.e. the trailing side) of the planetary gear 20 and the composite planetary staking pin 30. The composite planetary staking pin 30 is rotationally fixed such that the channel 52 remains on the right side (i.e. the leading side) of the planetary gear 20 during operation. This configuration ensures that the channel 52 does not rotate into the primary load zone as the planetary gear 20 travels around the sun gear 12. The flow of lubrication is shown by arrows (F) in FIG. 4. One of ordinary skill in the art would understand that the planetary transmission assembly 10 can experience a secondary mode, such as a coast mode, in which the planetary gear 20 travels counter-clockwise. The channel 52 has a relatively small axial size, which allows the rolling elements 60 to be supported along a majority of the outer surface of the outer sleeve 50, such as shown in FIG. 7, during secondary modes such as a coast mode. Due to the helical profile of the channel 52, the rolling elements 60 experience a more gradual engagement over the channel 52 compared to a straight, non-helical channel, and the outer sleeve 50 provides sufficient bearing support for the rolling elements 60.

In one embodiment, the composite planetary staking pin 30 is formed by a friction fit or press fit between the outer sleeve 50 and the inner pin body 40. These assembly steps are illustrated in FIGS. 8A-8C. FIG. 8A shows the inner pin body 40 in an unassembled state, and FIG. 8B shows the outer sleeve 50 in an unassembled state. FIG. 8C shows one embodiment of assembling the inner pin body 40 with the outer sleeve 50 by a friction fit or press fit step.

Having thus described various embodiments of the present planetary transmission assembly in detail, it is to be appreciated and will be apparent to those skilled in the art that many changes, only a few of which are exemplified in the detailed description above, could be made in the planetary transmission assembly without altering the concepts and principles embodied therein. The present embodiments are therefore to be considered in all respects as illustrative and not restrictive, the scope of the application being indicated by the appended claims rather than by the foregoing description, and all changes which come within the meaning and range of equivalency of the claims are therefore to be embraced therein.

LOG TO REFERENCE NUMBERS planetary transmission assembly 10
sun gear 12
sun gear teeth 14
ring gear 16
ring gear teeth 18
planetary gear 20
planetary gear teeth 22
planetary carrier 24
inlet 25
outlet 27
composite planetary staking pin 30
inner pin body 40
axial ends 42
circular grooves 44
outer sleeve 50
channel 52
rolling elements 60

What is claimed is:

1. A planetary transmission assembly comprising:
a planetary gear including planetary gear teeth configured to mesh with ring gear teeth and sun gear teeth;
a planetary carrier, the planetary gear being fixed to the planetary carrier by a composite planetary staking pin, and the planetary gear being supported on the composite planetary staking pin by rolling elements arranged between the composite planetary staking pin and the planetary gear;
the composite planetary staking pin including:
an inner pin body having axial ends with circular grooves, the composite planetary staking pin being fixed to the planetary carrier via staking of the axial ends of the inner pin body; and
an outer sleeve fixed to the inner pin body, the outer sleeve defining a circumferentially extending helical channel, wherein a lubricant flow path is defined by the channel between an inlet defined by the planetary carrier and an outlet to the rolling elements.

2. The planetary transmission assembly of claim 1, wherein the composite planetary staking pin is rotationally fixed and axially fixed to the planetary carrier.

3. The planetary transmission assembly of claim 2, wherein a primary load zone is defined between the rolling elements and the composite planetary staking pin as the planetary gear travels around a sun gear, and the channel of the outer sleeve is rotationally fixed away from the primary load zone.

4. The planetary transmission assembly of claim 1, wherein the outer sleeve is press-fit onto the inner pin body.

5. The planetary transmission assembly of claim 1, wherein the channel has an axial length that is at least 25% of a total axial length of the outer sleeve.

6. The planetary transmission assembly of claim 1, wherein the inner pin body is formed from a first material, and the outer sleeve is formed from a second material that is harder than the first material.

7. The planetary transmission assembly of claim 1, wherein the channel has a circumferential extent of 170-190 degrees.

8. The planetary transmission assembly of claim 1, wherein the rolling elements are needle rollers.

9. The planetary transmission assembly of claim 1, wherein the inner pin body is hollow and includes a central opening.

10. The planetary transmission assembly of claim 1, wherein the inner pin body is solid between the axial ends and the circular grooves.

11. The planetary transmission assembly of claim 1, wherein an axial extent of the channel is less than 10% of a total axial length of the outer sleeve.

12. A composite planetary staking pin comprising:
an inner pin body having axial ends including circular grooves, the axial ends being configured for staking with a planetary carrier; and
an outer sleeve fixed to the inner pin body, the outer sleeve defining a circumferentially extending helical channel.

13. The composite planetary staking pin of claim 12, wherein the outer sleeve is press-fit onto the inner pin body.

14. The composite planetary staking pin of claim 12, wherein the channel has an axial length that is at least 25% of a total axial length of the outer sleeve.

15. The composite planetary staking pin of claim 12, wherein the inner pin body is formed from a first material, and the outer sleeve is formed from a second material that is harder than the first material.

16. The composite planetary staking pin of claim 12, wherein the inner pin body is hollow and includes a central opening.

17. The composite planetary staking pin of claim 12, wherein the inner pin body is solid between the axial ends and the circular grooves.

18. The composite planetary staking pin of claim 12, wherein an axial extent of the channel is less than 10% of a total axial length of the outer sleeve.

19. A composite planetary staking pin comprising:
an inner pin body having axial ends including circular grooves, the axial ends being configured for staking with a planetary carrier; and
an outer sleeve fixed to the inner pin body, the outer sleeve defining a circumferentially extending helical channel, wherein the channel has a circumferential extent of 170-190 degrees.

* * * * *